United States Patent [19]
Honkawa et al.

[11] Patent Number: 5,735,075
[45] Date of Patent: Apr. 7, 1998

[54] FLORAL ARRANGEMENT WITH GIFT BOX SUPPORT

[75] Inventors: Bryan Honkawa, Marina del Rey; Karlin S. Wong, La Habra Heights, both of Calif.

[73] Assignee: Roll International Corporation, Los Angeles, Calif.

[21] Appl. No.: 685,450

[22] Filed: Jul. 19, 1996

[51] Int. Cl.$^6$ .................... A01G 5/00; A47G 7/06
[52] U.S. Cl. .............. 47/41.12; 47/66.6; 40/645; 40/661.11; 248/175
[58] Field of Search ............... 47/41.01, 41.12, 47/65.5, 66.6, 70; 40/645, 661.11; 248/156, 175, 176.1, 465.1, 688

[56] References Cited

U.S. PATENT DOCUMENTS

| | | | |
|---|---|---|---|
| 1,808,292 | 6/1931 | Coppersmith | 40/645 |
| 1,822,787 | 9/1931 | Slawson | 40/645 |
| 3,301,516 | 1/1967 | Bruno | 248/176.1 |
| 4,393,622 | 7/1983 | Gallo | 40/645 X |
| 4,521,990 | 6/1985 | Murray | 47/41.12 |
| 4,601,130 | 7/1986 | Du Vall | 47/41.12 |

FOREIGN PATENT DOCUMENTS

| | | | |
|---|---|---|---|
| 276344 | 10/1951 | Switzerland | 40/645 |
| 181882 | 6/1922 | United Kingdom | 40/645 |
| 1543559 | 4/1979 | United Kingdom | 248/465.1 |

OTHER PUBLICATIONS

Teleflora's Special for Valentine's Day –The Perfume Bottle Bouquet. Valentine's Day–Feb. 14.
Design Ideas to Stir Up business with the Butter Churn Bouquet, Teleflora's TV Special for Grandparents'Day –Sept. 9, 1994.

*Primary Examiner*—John A. Ricci
*Attorney, Agent, or Firm*—Pretty, Schroeder & Poplawski

[57] ABSTRACT

A floral kit and method including an open-mouthed container, a support and a rectangular box for holding a gift. The container holds a bouquet of flowers with their stalks projecting through the open mouth. The support has an upper cradle portion joined to a leg that projects downwardly from the cradle portion. The cradle portion includes back, bottom, front, and edges portions that cooperatively define a pocket with an opening of a predetermined size. The leg has a length sufficient to extend into the open mouth of the container to position the cradle portion of the support adjacent to the open mouth of the container. The box, for example a jewel box for a compact disk, is sized to fit at least partially within the cradle portion of the retainer. A block of floral foam can be removably positioned within the container for receiving and supporting the ends of the flower stalks to position the blossoms of the flowers positioned outside of the container.

14 Claims, 3 Drawing Sheets

FLORAL ARRANGEMENT WITH GIFT BOX SUPPORT

BACKGROUND OF THE INVENTION

The invention relates generally to flower holders, and, more particularly, to flower holders that removably receive the stems of a flower bouquet therein.

It has become popular in the floral industry to sell flower arrangements along with items that can be used by the purchaser after the flowers are no longer fresh and have been discarded. For example, arrangements are now frequently sold in useful containers such as cookie jars, perfume jars, coffee pots and the like, which have mating, detachable lids held within the arrangement by wire or plastic retainers. Retainers of this general type are described in U.S. Pat. Nos. 4,521,990 and 4,601,130, both owned by the assignee of the present invention, Roll International Corporation. While these retainers effectively hold detachable lids within a floral arrangement, they are incapable of securely holding other items, such as the gift boxes described below.

Many other desirable gifts are packaged in rectangular boxes, such as compact disks with popular music or software encoded thereon. Florists have encountered difficulty in selling floral arrangements with boxed gifts because of the lack of a convenient device for securing the gift box to the container at the time of sale. Delivery of un-attached gift boxes with floral containers can be accomplished, but is generally disfavored because the delivery person must simultaneously handle both the gift box and the floral arrangement. Because the delivery person has to handle two items instead of one, there is an increased likelihood that the delivery person may drop the gift box and damage it or even entirely forget to deliver the gift box with the floral arrangement.

One technique used in the past to secure gift boxes to the floral arrangement containers at the time of sale has been to affix the gift box directly to the container's side with adhesive tape. Although this technique is generally effective at securing the box, the high visibility of the tape and the inappropriate position of the gift box on the side of the container create an overall appearance that detracts from the beauty of the accompanying flower arrangement.

One disadvantage of the aforementioned tape arrangement is related to the busy working environment in a typical florist store. Many different floral arrangements are mass marketed to the public through florist stores by floral clearinghouse companies such as the TELEFLORA division of assignee Roll International Corporation. Because florists tend to deliver more floral arrangements during busy periods before the major holidays, florists generally favor floral arrangements that are easy to assemble regardless of the skill level of the particular employee who is assigned to assemble the arrangement. Thus, the above tape arrangement and other arrangements that could possibly include hastily-constructed assemblages of tape and pliable floral wire are disfavored because the assembly of each particular floral arrangement can be an inefficient and time consuming trial and error process resulting in an arrangement of questionable quality and deliverability.

A display device that is intended for mass-marketed floral arrangements is described in U.S. Pat. No. 3,301,516 to Bruno. This device has a stick-like rigid support member for insertion into floral foam. The rigid support is mounted to a T-shaped upper support with opposing strips of adhesive tape to engage an object such as a piece of fruit. By using devices of this general type, cans, jelly jars and the like have been adhesively fastened within floral arrangements. While the aforementioned device is generally acceptable under some circumstances, the adhesive tape is not well suited to supporting heavy objects and can leave an unattractive residue on the object. Further, the support of this device can rotate within the floral foam and thereby disturb the proper orientation of the object, resulting in an unattractive presentation of the object within the arrangement.

It should therefore be appreciated that there is a need for a florists' gift box support that can be conveniently used to securely attach a rectangular gift box to an open mouthed container simultaneously being used to hold a bouquet of flowers. The present invention fulfills this need.

SUMMARY OF THE INVENTION

The present invention provides a florists' gift box support that can be conveniently used to securely attach a rectangular gift box to an open-mouthed container simultaneously being used to hold a bouquet of flowers. The support holds the gift box adjacent to the flower bouquet so that the flowers compliment the gift box, thereby providing an attractive presentation of the gift to the recipient. More importantly, because the support allows quick and easy assembly of the floral kit, floral employees of even low skill can quickly and properly assemble the kit for delivery. Yet another advantage is that the support securely holds the gift box within the assembled kit so that the bouquet of flowers and the gift become one easily deliverable unit. Upon delivery, the recipient can easily remove the gift box from the support and there is no unsightly sticky residue left on the gift box.

More particularly, florist's gift box support includes a unitary, bent wire cradle that has first and second back portions extending laterally in generally opposite directions from a vertical center axis. First and second edge portions project in a forward direction from each of the back portions. A front portion extends between the forward end of the edge portions and at least a portion of the front portion is downwardly inclined relative to the central vertical axis and extends to a predetermined position spaced below the bottom of the box. The cradle also includes a bottom portion positioned to underlie and support the bottom of the box, thereby permitting boxes of varying thickness to be accommodated. At least one vertical leg is integral with the cradle and extends downwardly to pierce and be supported by floral foam, thereby supporting the gift box in proximity to the bouquet. If the opening of the container is narrow, floral foam may not be required to support the stalks of the flowers and the leg of the support.

In another more detailed aspect of the invention, the leg of the support can include a hook portion at its lower end, said hook portion extending to a predetermined position to engage the floral foam and thereby prevent the support from rotating. In another more detailed aspect of the invention, the front portion of the cradle is positioned apart from the back portions a distance less than the thickness of the gift box sufficient for the front portion to resiliently flex forwardly to grip the gift box within the cradle. Thus, the front portion of the cradle securely grips the gift box during the delivery of the arrangement.

A method of assembling a floral kit is also provided. The floral kit has a rectangular gift box, a support with unitary bent wire cradle, and a container having an opening for accepting the stalks of a bouquet of flowers therein. The gift box has an interior chamber for enclosing a gift. More particularly, the method includes mounting the cradle of the support adjacent to the opening of the container. The cradle includes a bottom portion and adjacent side edge portions that cooperatively define a pocket with a rectangular opening of a predetermined size. The method further includes placing the rectangular gift box at least partially within the pocket of the cradle, placing the stalks of the bouquet of flowers through the opening of the container, and securing the stalks of the bouquet of flowers within the container. It should be appreciated that the above steps can be accomplished in any order depending on the particular configuration of the flowers and the components of the floral kit. A body of stalk supporting material also can be placed within the container for receiving and supporting the ends of the flower stalks to position the blossoms of the flowers outside of the container.

Other features and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

The following drawings illustrate the preferred embodiment of the invention. In such drawings.

DESCRIPTION OF THE PREFERRED EMBODIMENT

Figure 1:
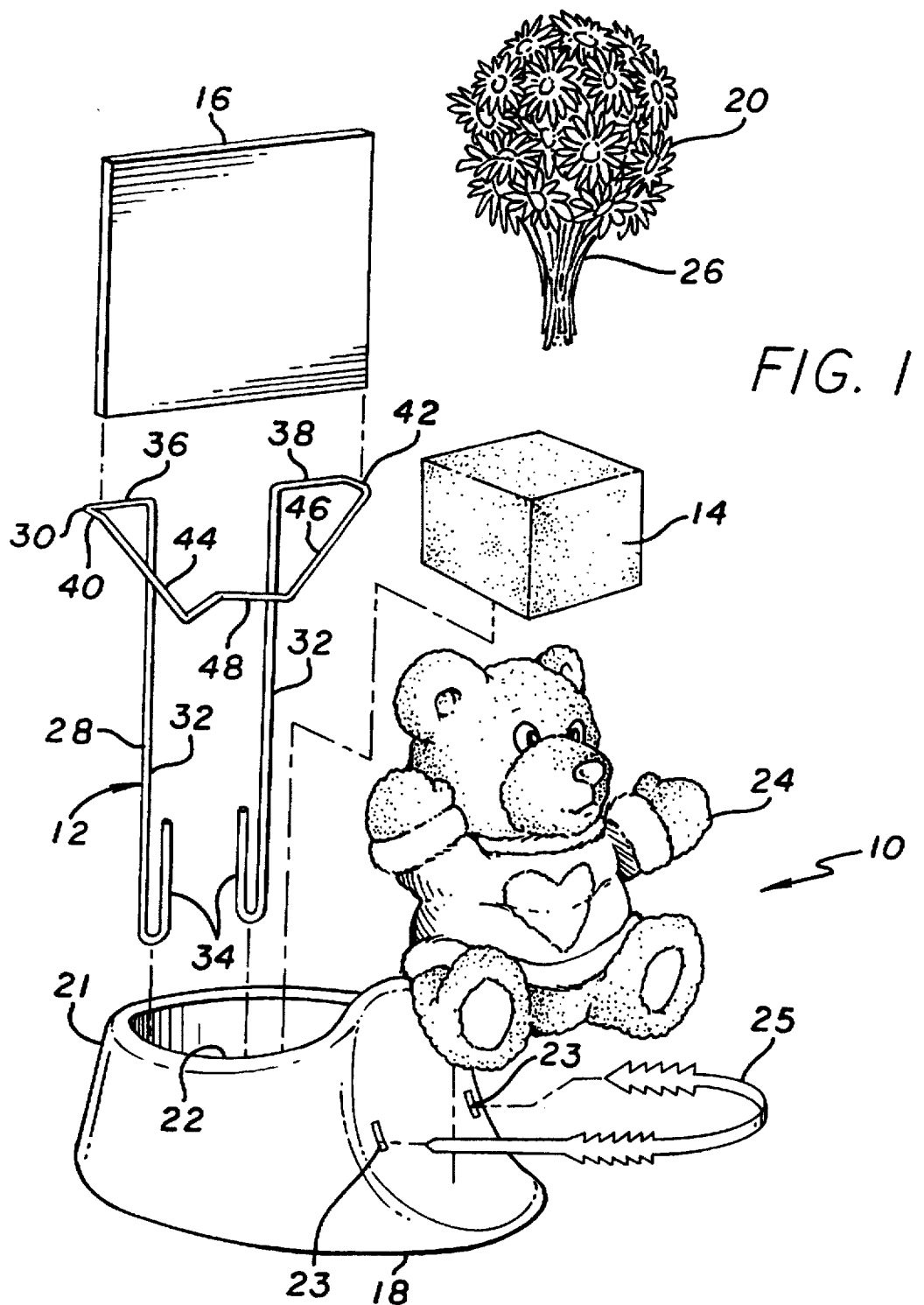
FIG. 1 is an exploded perspective view of a container holding a flower arrangement, in combination with a compact disk box that is mounted on the container using a wire support of the invention.
Figure 2:
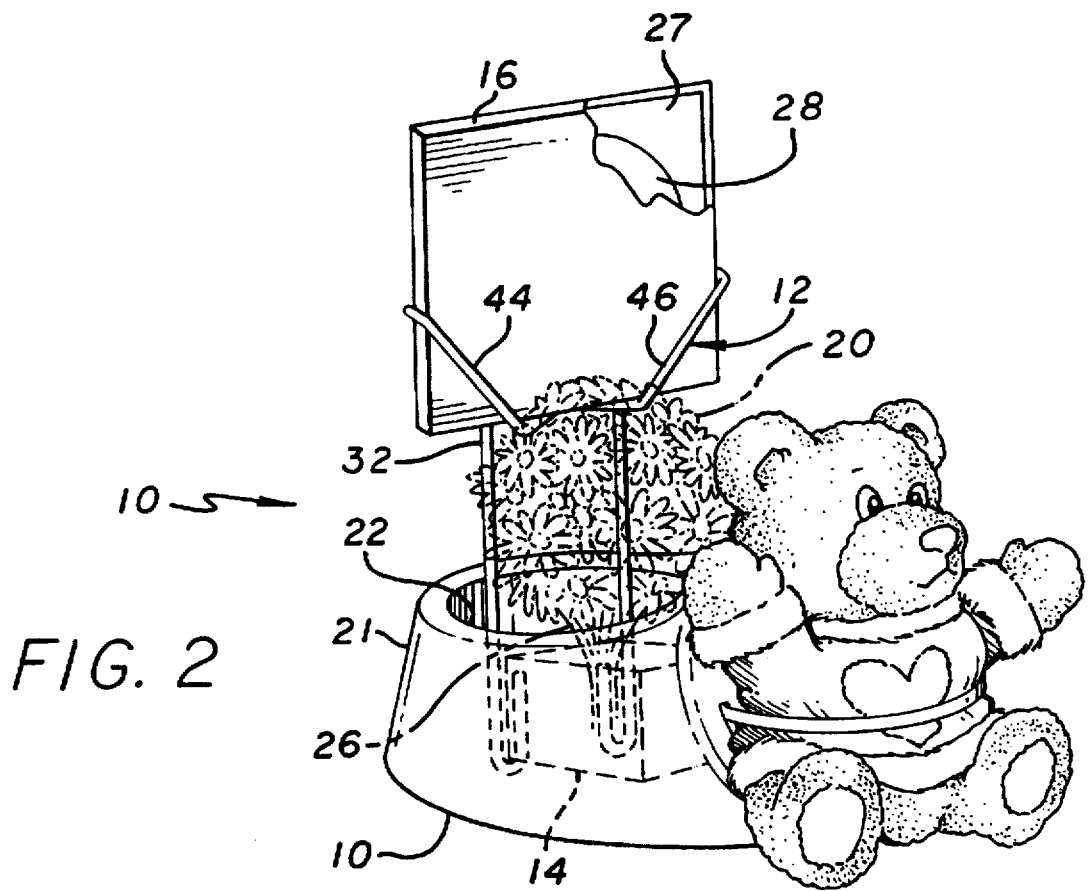
FIG. 2 is a perspective view of a container holding a flower arrangement, in combination with a compact disk box that is mounted on the container using the wire support of FIG. 1.

With reference now to the drawings, and particularly FIGS. 1 and 2, the present invention is preferably embodied in a floral kit, or arrangement, generally referred to by the reference numeral 10, that includes a special florists support 12 that engages a block of floral foam 14 to mount a compact disk box 16 to an associated flower container 18 in such away that the compact disk box 16 is attractively and securely mounted within a bouquet of flowers 20. The aforementioned arrangement 10 advantageously allows the compact disk box 16 to be attractively secured within the floral arrangement 10 for convenient assembly and delivery by floral employees of various skill levels.

The container 18 of the preferred floral arrangement 10 has side walls 21 defining an interior cavity with an open mouth 22. Two slots 23 in the side walls of the container 18 allow a stuffed animal toy 24 to be fastened thereto with a barbed plastic strap 25. The container 18 can be made of ceramic, plastic or any other material of suitable strength.

The flower bouquet 20 is supported in the container 18 by the block of floral foam 14 (FIG. 2). In particular, the stalks 26 of the flowers 20 are secured by insertion into the foam block 14. The floral foam block 14 can be formed of rigid, foamed polyurethane and is commonly available from floral industry vendors in blocks of various size. The compact disk box 16 is of the type made of plastic and commonly referred to as a "jewel" box. The compact disk box 16 has an inside surface 27 for holding a compact disk 28. The compact disk 28 has software or music encoded thereon to provide a lasting gift for the enjoyment of the recipient of the floral arrangement 10. It should be appreciated that in FIG. 2 the flowers 20 and their stalks 26 are shown by broken lines for the sake of clearly illustrating the components of the kit 10. The compact disk box 16 is held by the special support 12, as described below.

Figure 5:
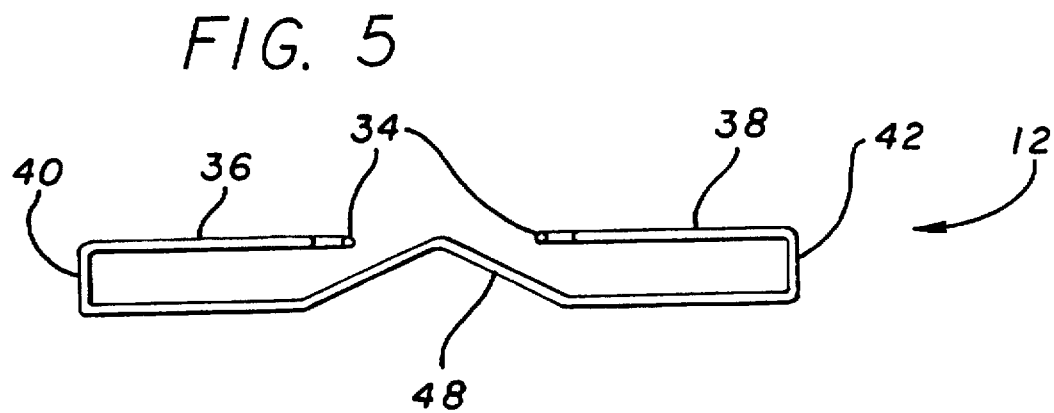
FIG. 5 is a top plan view of the wire support of FIG. 1.
Figures 3, 4:
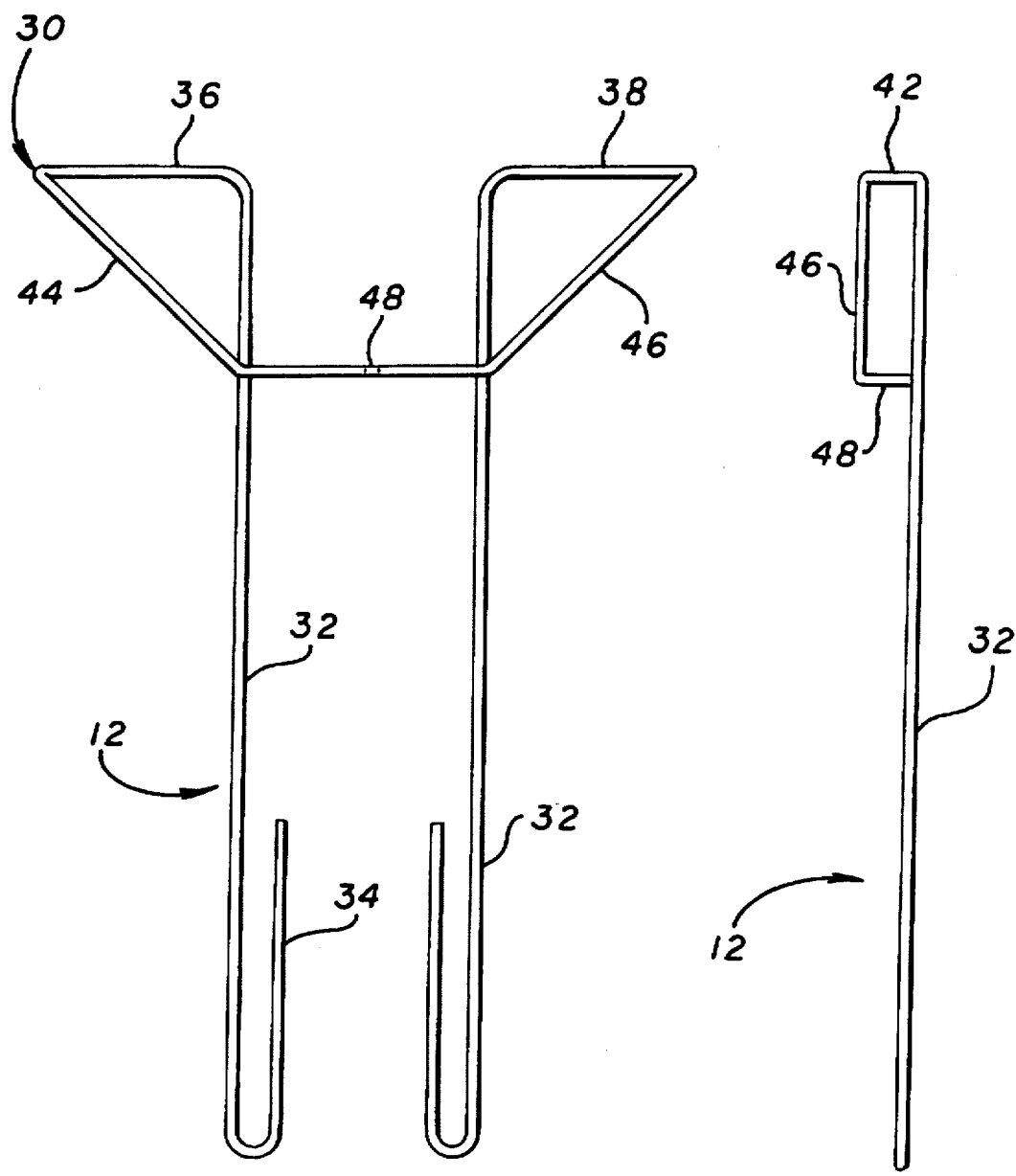
FIG. 3 is an elevational front view of the wire support of FIG. 1.
FIG. 4 is a side elevational view of the wire support of FIG. 1.

The preferred support 12 is comprised of a single piece of resilient vinyl coated wire (FIGS. 3, 4 and 5) formed into a specially shaped upper cradle portion 30 with two integrally formed legs 32 projecting downwardly therefrom. The diameter of the wire preferably is approximately 2 millimeters. However, wire of other diameters can be used depending on the weight of the gift box of a particular application. Since the support 12 is formed from a single piece of wire, it is extremely inexpensive to manufacture, yet easy to use and effective in attractively securing the compact disk box 16 within the floral arrangement 10. The specific portions of the support 12 will be described below.

The legs 32 of the support are aligned in a generally parallel relationship and have hook-shaped lower ends 34 to engage the floral foam 14, as will be described later. The legs 32 have a length sufficient to support the cradle portion 30 of the support 12 above the open mouth 22 of the container 18.

The cradle portion 30 of the support 12 has first and second back portions 36 and 38 extending horizontally away from the upper ends of the legs 32. Both of the back portions 36 and 38 preferably are coplanar with the legs 32. Because the back portions 36 and 38 of the cradle 30 are separated, the cradle 30 can flex resiliently in a direction parallel to the back portions 36 and 38 to grip boxes of differing width. The cradle portion 30 further includes a first edge portion 40 and a second edge portion 42 that each extend perpendicularly away from the ends of the respective first and second back portions 36 and 38. The edge portions 40 and 42 are spaced apart a distance sufficient to accept the compact disk box 16 therebetween.

The cradle portion 30 of the support 12 further includes first and second front portions 44 and 46 and a bottom portion 48. The first and second front portions 44 and 46 extend diagonally downwardly at a 45 degree angle from the horizontal from the ends of the respective first and second edge portions 40 and 42. The front portions 44 and 46 terminate at and are integrally joined with the bottom portion 48. The lower ends of the first and second front portions 44 and 46 are spaced apart from the back portions 36 and 38 and legs 32 of the support 12 a distance slightly less than the thickness of the compact disk box 16 so that the front portions 44 and 46 resiliently flex forwardly upon the insertion of the box 16 into the cradle 30. Because of the resilient nature of the front portions 44 and 46 of the cradle 30, the front portions 44 and 46 frictionally engage the compact disk box 16 to secure it within the cradle 30. This spring-like operation of the front portions 44 and 46 of the cradle 30 is optional and may not be needed for gift boxes having dimensions that differ from the preferred compact disk box 16.

The bottom portion 48 of the support's cradle portion 30 is bent inwardly toward the legs 32 to support the compact disk box 16. In sum, the cradle portions 36, 38, 40, 42, 44 and 46 and the bottom portion 48 of the support's cradle portion 30 cooperatively define an upper opening and a pocket sized to accept the compact disk box 16 therein. Preferably, the cradle is 152 millimeters wide (as measured between the edge portions 40 and 42), 11 millimeters deep (as measured between the front portions 44 and 46 and the back portions 36 and 38), and 44 millimeters high (as measured vertically from the bottom portion 48 to the back portions 36 and 38). One advantage associated with the bottom portion 48 of the cradle 30 is that one support 12 can be used with other compact disk boxes that are not as thick as the "jewel" box, such as compact disk boxes made of paper.

The assembly of the preferred floral arrangement 10 will now be described (FIGS. 1 and 2). The floral arrangement 10 is assembled by inserting the hook shaped ends 34 of the support legs 32 into the block of floral foam 14. The hook shaped end 34 of each leg 32 is inserted into the foam such that a portion of the foam 14 is located between the hook shaped end 34 and the remainder of the leg 32, thereby preventing the rotation of the leg 32 with respect to the foam block 14. Because rotation of each leg 32 is prevented by its hook shaped-end 34, the compact disk box 16 will not rotate with relation to the flowers 20, thereby avoiding the unattractive presentation of the rear of the box 16 to the recipient.

The legs 32 of the support 12 and the foam block 14 are then inserted through the opening 22 of the container 18 to rest in the interior cavity of the container 18. The flower bouquet 20 is then assembled and the stalks 26 of the flowers 20 are inserted into the floral foam 14 so that the flower blossoms are located above the opening of the container 18. The stuffed animal toy 24 is located between the slots 23 in the container 18 and the strap 25 is positioned around the bear. The strap 25 is then pulled tight so that its barbs engage the slots 23 to secure the animal toy to the container 18. If the opening 22 of the container 18 is narrow and thus will support the flower stalks 26 and the legs 32 of the support 12, the block of floral foam 14 may not be needed. Finally, the compact disk box 16 is inserted into the pocket formed by the cradle portion 30 of the support 12. The bottom portion 48 of the support 12 is located under the compact disk box 16 to prevent it from sliding through the support 12. Upon insertion of the compact disk box 16 into the cradle 30, the front portions 44 and 46 resiliently move forward to grip the box 16. Thus, the box 16 is held between the legs 32 and back portions 36 and 38 of the support 12 and the front portions 44 and 46 of the support 12.

A primary advantage of the preferred floral kit 10 is that the support 12 holds the compact disk box 16 above the flower bouquet 20 so that the flowers 20 generally obscure the support 12 and compliment the gift of the compact disk box 16, thereby providing an attractive presentation of the compact disk box 16 within the floral arrangement 10. Further, because the special support 12 allows quick and easy assembly of the arrangement 10, floral employees of even low skill levels can quickly and properly assemble the arrangement 10. Yet another advantage is that the support 12 securely holds the compact disk box 16 within the arrangement 10 so that the bouquet of flowers 20 and the gift of the compact disk are one, easily deliverable unit. Upon delivery, the recipient also can easily remove the compact disk box 16. Finally, when the recipient of the arrangement 10 easily removes the gift of the compact disk box 16, no unattractive sticky residue is left on the box 16.

While a particular form of the invention has been illustrated and described, it will be apparent that various modifications can be made without departing from the spirit and scope of the invention. Accordingly, it is not intended that the invention be limited, except as by the appended claims.

We claim:

1. A florist's gift box support intended to display a generally rectangular gift box in proximity to a floral bouquet mounted in an open mouthed container having floral foam for receiving the stalks of the bouquet, comprising:
   a unitary, bent wire cradle having,
      first and second back portions extending laterally in generally opposite directions from a vertical center axis,
      first and second edge portions projecting in a forward direction from each of said back portions,
      a front portion extending between the forward end of said edge portions, at least portions of said front portion being downwardly inclined relative to said central vertical axis to a predetermined position spaced below the bottom of the box,
      a bottom portion positioned to underlie and support the bottom of the box, thereby permitting boxes of varying thickness relative to the forward projection of said cradle to be accommodated; and
   at least one vertical leg integral with said cradle extending downwardly to pierce and be supported by the floral foam, thereby supporting the gift box in proximity to the bouquet.

2. The floral kit of claim 1, wherein said vertical leg includes a hook portion at its lower end, said hook portion extending to a predetermined position to engage the floral foam to prevent rotation of said leg with respect to the foam.

3. The floral kit of claim 2, wherein said front portion of said cradle is positioned apart from said back portions a distance less than the thickness of the gift box sufficient for said front portion to resiliently flex forwardly to grip the gift box within said cradle.

4. The floral kit of claim 1, wherein said front portion of said cradle is positioned apart from said back portions a distance less than the thickness of the gift box sufficient for said front portion to resiliently flex forwardly to grip the gift box within said cradle.

5. A florist's gift box support intended to display a generally rectangular gift box in proximity to a floral bouquet mounted in an open mouthed container having floral foam for receiving the stalks of the bouquet, comprising:
   a unitary, resilient bent wire cradle having,
      first and second back portions extending laterally and generally symmetrically in opposite directions from a vertical center axis,
      first and second edge portions projecting in a forward direction from each of said back portions,
      a front portion extending between and integral with the forward end of said edge portions, at least portions of said front portion being downwardly inclined relative to said central vertical axis to a predetermined position spaced below the bottom of the box,
      a rearwardly bent region in said front portion sufficient to underly and support the bottom of the box, thereby permitting boxes of varying thickness relative to the forward projection of said cradle to be accomodated; and
   at least one vertical leg integral with said cradle extending downwardly to pierce and be supported by the floral foam, thereby supporting the gift box in proximity to the bouquet.

6. The floral kit of claim 5, wherein said vertical leg includes a hook portion at its lower end, said hook portion extending to a predetermined position to engage the floral foam to prevent rotation of said leg with respect to the foam.

7. The floral kit of claim 6, wherein said front portion of said cradle is positioned apart from said back portions a distance less than the thickness of the gift box sufficient for said front portion to resiliently flex forwardly to grip the gift box within the cradle.

8. The floral kit of claim 5, wherein said front portion of said cradle is positioned apart from said back portions a distance less than the thickness of the gift box sufficient for said front portion to resiliently flex forwardly to grip the gift box within said cradle.

9. A floral kit to hold a bouquet of flowers having stalks supported by floral foam, the kit comprising:

an open mouthed container sized to receive the floral foam therein;

a rectangular box having an interior surface defining a chamber sized to hold a gift therein; and a unitary, bent wire cradle having,
first and second back portions extending laterally in generally opposite directions from a vertical center axis,
first and second edge portions projecting in a forward direction from each of said back portions,
a front portion extending between the forward end of said edge portions, at least portions of said front portion being downwardly inclined relative to said central vertical axis to a predetermined position spaced below the bottom of the box,
a rearwardly bent region in said front portion sufficient to underly and support the bottom of the box, thereby permitting boxes of varying thickness relative to the forward projectoin of said cradle to be accomodated; and
at least one vertical leg integral with said cradle extending downwardly to pierce and be supported by the floral foam, thereby supporting the gift box in proximity to the bouquet.

10. The floral kit of claim 9, wherein said vertical leg includes a hook portion at its lower end, said hook portion extending to a predetermined position to engage the floral foam to prevent rotation of said leg with respect to the foam.

11. The floral kit of claim 10, wherein said front portion of said cradle is positioned apart from said back portions a distance less than the thickness of the gift box sufficient for said front portion to resiliently flex forwardly to grip the rectangular gift box within said cradle.

12. The floral kit of claim 9, wherein said front portion of said cradle is positioned apart from said back portions a distance less than the thickness of the gift box sufficient for said front portion to resiliently flex forwardly to grip the rectangular gift box within said cradle.

13. A method of assembling a floral kit having a rectangular gift box, a support with a unitary bent wire cradle, and a container having an opening for accepting the stalks of a bouquet of flowers therein, the gift box having an interior chamber for enclosing a gift, the method comprising the steps of:

mounting the cradle of the support adjacent to the opening of the container, the cradle including a bottom portion and adjacent side edge portions cooperatively defining a pocket with a rectangular opening of a predetermined size;

placing the rectangular gift box at least partially within the pocket of the cradle;

placing the stalks of the bouquet of flowers through the opening of the container; and securing the stalks of the bouquet of flowers within the container.

14. The method of claim 13, further comprising placing a body of stalk supporting material within the container for receiving and supporting the ends of the flower stalks to position the blossoms of the flowers outside of the container.

* * * * *